Jan. 22, 1946.   F. J. BOUCHARD   2,393,229
ABSORPTION OF CHLORINE
Filed July 27, 1942
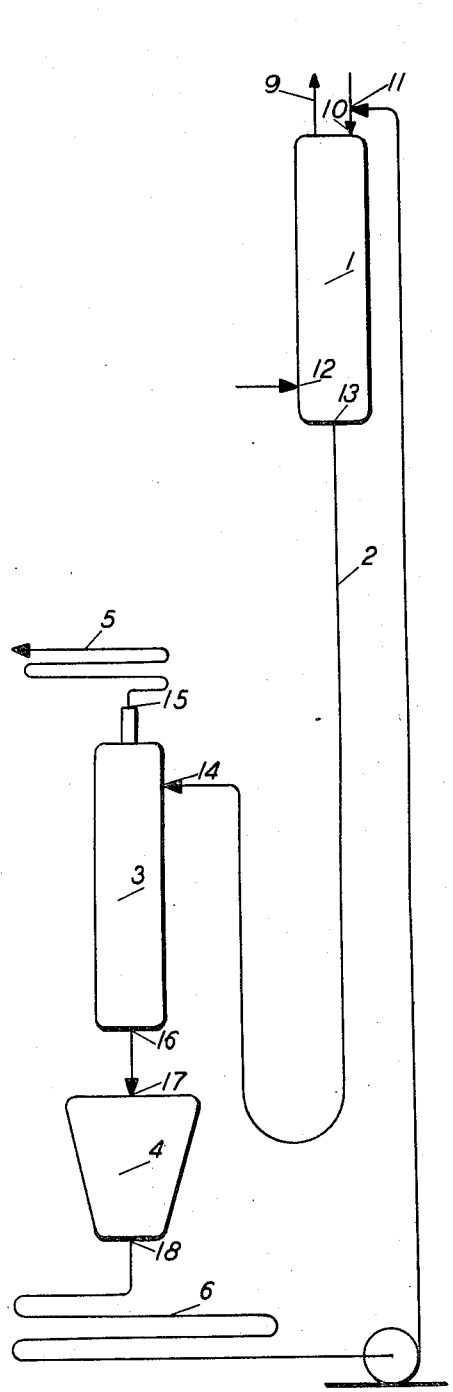
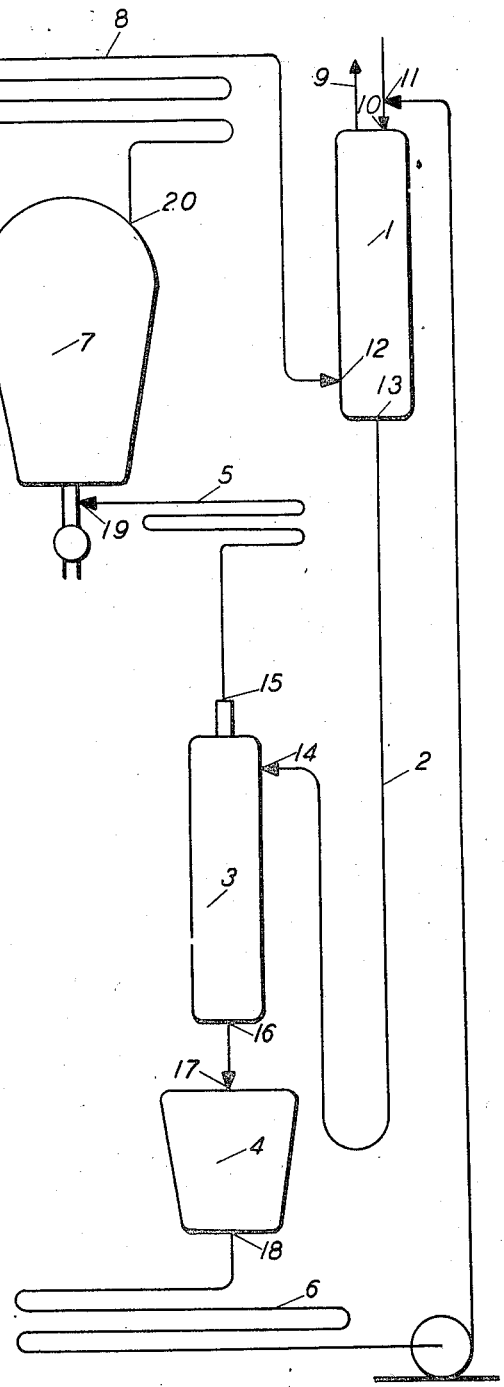
FIG. 1
FIG. 2
INVENTOR.
FREDERIC J. BOUCHARD
BY Patented Jan. 22, 1946

2,393,229

UNITED STATES PATENT OFFICE 2,393,229

ABSORPTION OF CHLORINE

Frederic James Bouchard, Radford, Va., assignor to Hercules Powder Company, Wilmington, Del., a corporation of Delaware Application July 27, 1942, Serial No. 452,461

1 Claim. (Cl. 183—115)

This invention relates to an apparatus for use in recovering chlorine from mixtures with other gases.

The problem of separating chlorine from gaseous impurities with which it has become admixed has always been a difficult one. The principal ways of accomplishing this in the past have been either to liquefy the gaseous chlorine or to cause it to react with some substance to form a compound. The liquefying process involves large expenses for compressing and refrigerating equipment. When new compounds are formed, they in turn must be subjected to treatments to break them down to regain the desired free chlorine.

Now the chlorine is separated from associated gaseous impurities by the simple and economical process of dissolving it in an organic solvent with which the chlorine will not react and, if it is desired, free gaseous chlorine is obtained by stripping it from the solution. Now in accordance with this invention, this process is carried out in an apparatus whose contact surfaces are rendered resistant to the action of chlorine by being constructed of carbon rendered impervious by synthetic resin in the pores.

Now in accordance with this invention, the chlorine found for example, in the waste gases given off in the chlorination of rubber may be easily and economically reclaimed and used over again in the chlorination process. To accomplish this, it is preferable to use carbon tetrachloride as an absorbent. This solvent is preferred as there is already carbon tetrachloride present in the process and there is no danger of introducing foreign substances into the process. This method is efficiently and cheaply carried out in a containing apparatus lined with carbon rendered impervious by forming synthetic resin in the pores. This material will withstand the destructive action of the chlorine and carbon tetrachloride. An apparatus in accordance with this invention for carrying out the chlorine recovery is illustrated by the drawing in which:

Figure I represents diagrammatically an apparatus suitable for carrying out the process of reclaiming chlorine by dissolving it in an organic solvent and stripping the chlorine out of the solution.

Figure II represents diagrammatically a combination of apparatus suitable for purifying the chlorine in the exhaust gases of a rubber chlorinator and for utilizing the reclaimed chlorine by introducing it back into the chlorinator.

Referring to Figure I, 1 designates an absorption tower into which the solvent is introduced at the top. The chlorine, with its impurities, is introduced at the bottom to flow countercurrent to the solvent. The organic solvent with the chlorine dissolved in it is drawn off at the bottom. 2 indicates a connection with a pressure leg between the absorption tower 1 and a fractionating column 3 for stripping the chlorine from the carbon tetrachloride solution. The fractionating column and the absorption tower are so constructed that their contact surfaces are of impervious carbon. 4 indicates a still pot where the solvent is heated to complete the stripping and to vaporize a portion for reflux. 5 indicates a partial condenser for providing reflux and for removing solvent vapors from the recovered gaseous chlorine. 6 indicates a coil for cooling stripped carbon tetrachloride solvent before it is recycled to the absorption tower for reuse. 9 indicates an outlet for the escape of non-dissolved hydrogen chloride gas. 10 indicates an inlet for fresh and recycled absorption medium to the absorption tower 1. 11 indicates an inlet for recycled absorption medium into a feed line containing fresh absorption medium. 12 indicates an inlet for impure gaseous mixtures into the absorption tower 1. 13 indicates an outlet from the absorption tower 1 for absorption medium containing dissolved gases. 14 indicates an inlet for absorption medium, containing dissolved gases into the stripping tower 3. 15 indicates an outlet from the stripping tower 3 to the partial condenser 5. 16 indicates an outlet from the stripping tower 3 to the still pot 4. 17 indicates an inlet for recovered absorption medium to the still pot 4. 18 indicates an outlet for recovered absorption medium from the still pot 4 to the cooling coil 6.

Referring to Figure II, it will be noted that the apparatus there shown is like that in Figure I, except that here it is especially adapted for use in reclaiming impure chlorine in a rubber chlorinating process. 7 designates the chlorinator from which the impure excess chlorine is given off and 8 designates a reflux condenser for removing carbon tetrachloride from the impure gases before they are introduced into the absorption tower. 19 indicates an inlet for purified chlorine from the partial condenser 5 into the chlorinator 7. 20 indicates an outlet for impure gases from the chlorinator 7 into the reflux condenser 8.

A specific example of the use of the apparatus in accordance with this invention is here given, directed to the process of recovery and re-use of chlorine evolved in a rubber chlorinating process.

Inasmuch as the process involved re-use of the recovered chlorine, an apparatus as shown in Figure II was used.

The absorption tower 1 was lined with impervious carbon. The impervious carbon here used was a material which is sold under the commercial name of "Karbate." It is made by rendering graphitic or amorphous carbon impervious by depositing synthetic resin in the pores of the carbon. The tower was packed with Raschig rings also made of Karbate. The stripping column 3 was constructed and packed in the same manner as the absorption tower. The still pot 4 and the chlorinator 7 were of ceramic construction.

Carbon tetrachloride was introduced into the top of the tower at a temperature of 20° C. The gases from the chlorinator 7 were introduced at the bottom of the tower as also shown in the figure. The gases flowed upward, counter-current to the carbon tetrachloride solution. The gases which were not absorbed by the carbon tetrachloride, and which consisted mostly of hydrogen chloride and air, were led off from the top of the tower for subsequent absorption of the hydrogen chloride.

The carbon tetrachloride, carrying the chlorine in solution at a concentration of 3.8%, passed out the bottom of the absorption column through a pressure leg 2 into the stripping column 3, wherein the chlorine was separated from the carbon tetrachloride. The stripping column was provided with reflux by the condenser 5 which substantially eliminated carbon tetrachloride vapor from the chlorine. The chlorine thus recovered and purified was re-introduced into the chlorinator. The carbon tetrachloride passed from the stripping column down into the still pot 4 which was heated by a steam jacket to vaporize the chlorine and to provide reflux for the stripping column.

The stripped carbon tetrachloride was tapped from the bottom of the still pot and was recycled to the top of the absorption tower after first being cooled to 20° C. by the cooling coil 6.

Materials of construction used in the equipment hereinabove described play an important part in the successful operation of the process. Due to the corrosive nature of the substances being handled, it is necessary to find a material which will not be destroyed. Unexpectedly, it was found that carbon rendered impervious by sealing the pores thereof with resin withstood the chlorine and acid present, and in addition, in the presence of the chlorine, it withstood organic solvents such as carbon tetrachloride without loss of the required imperviousness.

Accordingly, it is the essence of the present invention to treat or contain mixtures (including solutions) of free chlorine and organic solvents therefor, such as carbon tetrachloride; in vessels having contact surfaces of carbon rendered impervious by resins. The carbon may be graphite or amorphous structural carbon or a mixture of both forms. The resin may be deposited therein as such or formed in situ by polymerization or condensation. Condensation in situ to an insoluble infusible state is preferred, but in all cases the resin should be substantially insoluble in the organic chlorine solvent in the presence of free chlorine. Thus, for example, resins such as furfural polymerization products, phenol-formaldehyde, anilin-formaldehyde, phenol-furfural resins, lignin-furfural condensation products, etc., have been found suitable.

Although the lining material prepared in accordance with this invention is advantageous where carbon tetrachloride is used as the solvent, it is also an essential element in the chlorine recovery process where other organic solvents substantially non-reactive with chlorine, such as chloroform, methylene chloride, dichlorodifluoromethane, trichlorofluoromethane, 1,1,1 trichloroethane, acetic acid, acetic anhydride or dichloroacetic acid are used. Likewise, although in the example given, the apparatus in accordance with this invention was used in a process for recovering chlorine, it is equally advantageously used in processes for the recovery of other halogens such as bromine, and iodine.

Although in the example given the temperature of the carbon tetrachloride was kept at 20° C., the lining prepared in accordance with this invention will not break down if the process is carried on at temperatures as high as about 75° C. The operation is usually best carried on at a temperature below 25° C., but above the freezing point of the solvent.

The process in which this material was used, as described in the example, indicates a means for recycling the carbon tetrachloride so that it may be used over again. Although this is considered the more desirable method of operating, it is to be understood that the process can be operated without this recycling feature. Fresh carbon tetrachloride may be continuously introduced into the Karbate-lined absorption tower or the stripped carbon tetrachloride may be drawn off from the still pot and re-introduced into the absorption tower.

The preferred chlorine recovery process provides a means for reclaiming the chlorine from the solvent and making the chlorine available for re-use. However, the invention may be used to advantage without employing this step. That is, it may be found desirable to obtain the chlorine by dissolving it in a solvent and to utilize it in this form.

In the example of the use of this invention, the inclusion of a device for cooling the carbon tetrachloride is indicated. In the example, it was found preferable to insert the cooling device directly after the still pot. It is to be understood, however, that the cooling may be accomplished by inserting the cooling means at other points in the system. For example, it may be accomplished by cooling the Karbate-lined absorption tower.

The preferred embodiment of this invention has been shown to be in an apparatus for recovering chlorine from the exhaust gases of a rubber chlorinating process. In a rubber chlorinating process, the impurities with which the chlorine is mixed are usually hydrogen chloride gas, gaseous carbon tetrachloride, and sometimes water vapor. It is frequently found advantageous in the rubber chlorinating process to carry on the process in the presence of a certain amount of air. The apparatus in accordance with this invention is capable of withstanding the corrosive action of the chlorine even in the added presence of air and water. The air and water being insoluble in the liquid carbon tetrachloride, will remain in gaseous form and may be drawn off along with the undissolved hydrogen chloride from the top of the absorption tower. The air is easily separated from the hydrogen chloride during the process of recovering hydrogen chloride.

In place of the Raschig rings of impervious carbon used as a packing in the absorption tower in Figure II, it is possible to use other types of packing. Thus, either ceramic or carbon material may be used in the form of Berl saddles, helical packing, corrugated blocks, edge-stacked tile, or any other shape desired. Crushed silica and coke have also been used with satisfactory results.

The present invention is useful wherever it is desirable to treat or contain chlorine or mixtures (including solutions) of free chlorine and an organic solvent therefor, such as carbon tetrachloride in vessels. Particularly useful is the present invention in processes for obtaining pure chlorine wherever it has become admixed with inert gases such as hydrochloric acid, air, or oxygen. Chlorine is most often found in such an impure state when it is prepared from hydrochloric acid or when it has been used in chlorinating an organic compound. Thus, the present invention may be used to advantage in the extraction of chlorine from mixtures with air and oxygen which are obtained when chlorine is prepared by the Deacon method of oxidizing hydrochloric acid by passing it over a catalyst of cuprous chloride.

It is also used to great advantage in recovering the excess chlorine present in the manufacture of chlorinated stearic and other fatty acids, chlorinated naphthalene, chlorinated paraffin and other waxes, chlorinated biphenyl, chlorinated benzene, and the like.

What I claim and desire to protect by Letters Patent is:

In a process in which chlorine is absorbed from a gaseous mixture comprising chlorine and hydrogen chloride by solvent action thereon of carbon tetrachloride brought in contact with the gaseous mixture, the improvement which consists in conducting said absorption in contact with containing surfaces substantially entirely composed of carbon having the pores thereof sealed with synthetic resin selected from the group consisting of furfural polymers, phenol-formaldehyde resins, aniline-formaldehyde resins, phenol-furfural resins, and lignin-furfural resins.

FREDERIC JAMES BOUCHARD.